May 1, 1956　　　M. M. BALSAM　　　2,743,777
APPARATUS FOR CUTTING A STRIP INTO
PORTIONS OF A PREDETERMINED LENGTH
Filed March 9, 1953
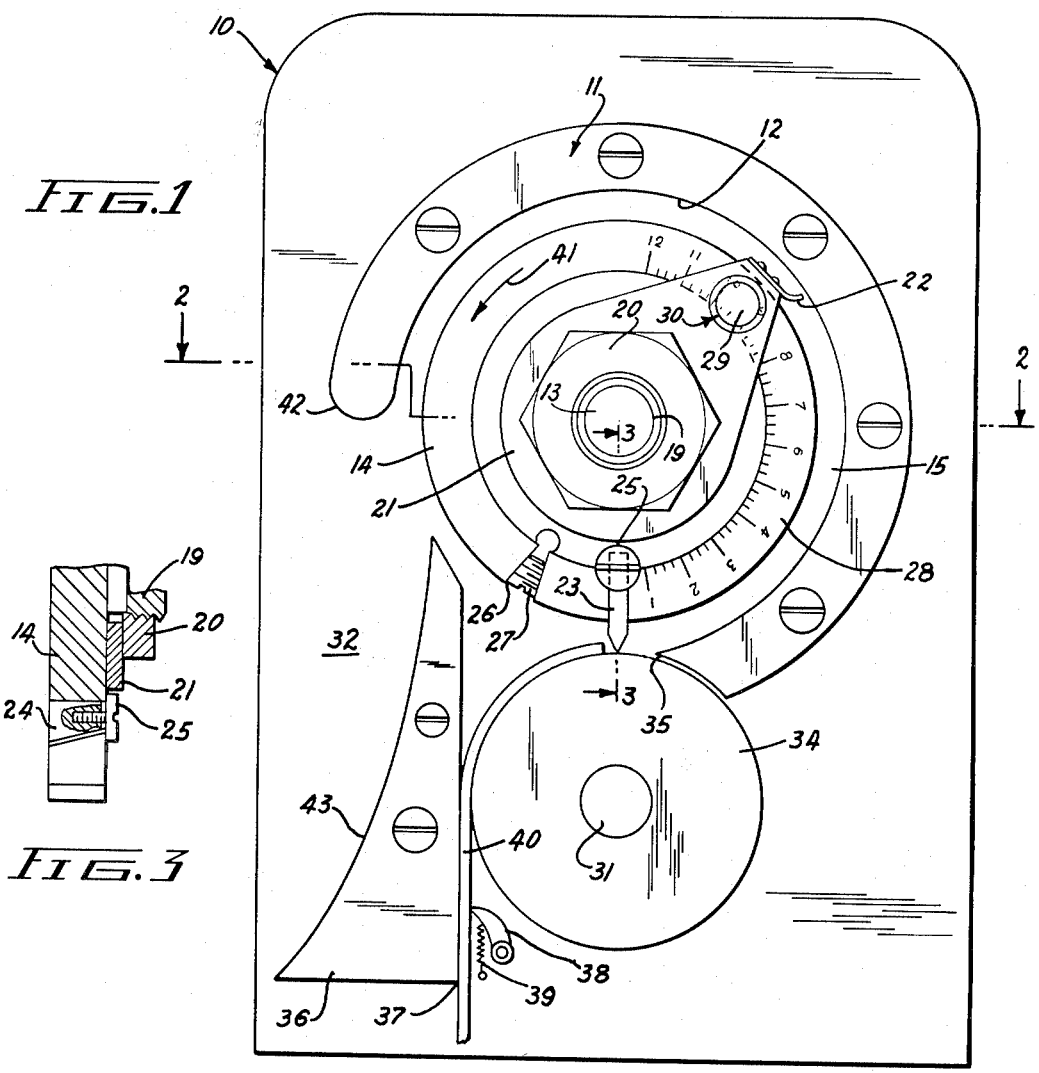
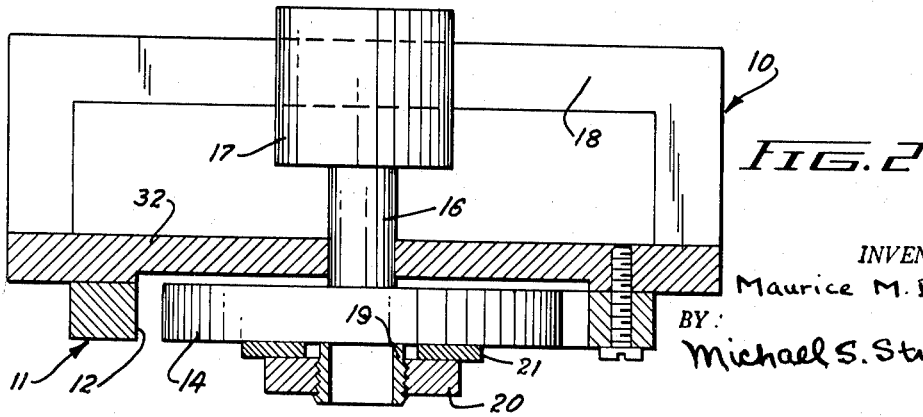
INVENTOR:
Maurice M. Balsam
BY:
Michael S. Striker
agt

United States Patent Office 2,743,777
Patented May 1, 1956

2,743,777
APPARATUS FOR CUTTING A STRIP INTO PORTIONS OF A PREDETERMINED LENGTH

Maurice M. Balsam, New York, N. Y.

Application March 9, 1953, Serial No. 341,196

3 Claims. (Cl. 164—68)

The present invention relates to a sheet material cutting apparatus.

More particularly, the present invention relates to an apparatus for cutting a strip, as it is unwound from a roll, for example, into portions having a predetermined length. There are many industries where bands of a predetermined length are required to be cut from a long strip, and the present invention relates to an apparatus for cutting such bands from a strip.

One of the objects of the present invention is to provide an apparatus capable of automatically cutting a strip into portions of a predetermined length.

A further object of the present invention is to provide a means for adjusting the length of the portions into which the strip is cut.

Another object of the present invention is to provide a single drive means which moves both the strip to be cut and the blade for cutting the same.

An additional object of the present invention is to provide an apparatus capable of accomplishing all of the above objects while at the same time being made up of a small number of simple and ruggedly constructed parts.

With the above objects in view, the present invention mainly consists of an apparatus for cutting a strip of sheet material into portions having a predetermined length, this apparatus including a support means having a surface along which the strip to be cut is adapted to be moved. A moving means is mounted on the support means for engaging a strip at a predetermined part of the surface of the support means and for moving the strip along this surface away from the said predetermined part thereof. A cutting means is provided to cut the strip at the said predetermined part of the surface after the moving means has moved a predetermined distance beyond the said part of the surface of the support means, this cutting means being connected to the moving means for movement therewith.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a front elevational view of an apparatus constructed in accordance with the present invention;

Fig. 2 is a partly sectional plan view of the structure of Fig. 1 taken along line 2—2 of Fig. 1 in the direction of the arrows; and Fig. 3 is a sectional view taken along line 3—3 of Fig. 1 in the direction of the arrows.

Referring now to the drawings, it will be seen that the structure of the invention includes a support means 10 having a front wall 32 carrying a rigid member 11 formed with an arcuate surface 12 located at a predetermined radial distance from the axis 13. The disc 14 is carried by the support means 10 for turning movement about the axis 13, this disc 14 having a radius smaller than the radial distance of surface 12 from axis 13 so as to provide an arcuate space 15 between the disc 14 and the surface 12. The disc 14 is carried by the shaft 16 of motor 17 which is carried by the frame part 18 of support means 10, as shown in Fig. 2, and the axis of shaft 16 and disc 14 is coincident with the axis 13.

An outwardly threaded tubular member 19 is fixed to the front face of disc 14 concentrically therewith, and a nut 20 is threadedly carried by the member 19. Between the nut 20 and disc 14 is located a plate member 21 which is formed with a circular opening through which part 19 extends so that plate 21 is freely turnable with respect to the disc 14 about the axis 13 and may be releasably fixed to the disc 14 by the nut 20. The plate 21 has an outer end overlapping the periphery of disc 14 and carrying a moving member 22, which may for example be in the form of a substantially rigid piece of curved metal riveted to plate 21 and extending into the arcuate space 15 almost up to the surface 12.

The disc 14 is formed with a radial notch in which a cutting blade 23 is located. As is apparent from Fig. 3, the blade 23 is located below a wedge-shaped member 24 threadedly connected to the screw member 25 whose head bears against the front face of disc 14 so that upon turning of the screw 25 the member 24 may be moved to engage the blade 22 and move the outer cutting edge thereof toward the surface 12. The disc 14 is further provided, close to the blade 23, with an internally threaded substantially conical notch 26 in which a conical screw member 27 is threadedly mounted. Thus, upon movement of member 27 out of notch 26, the blade 23 will be loosened from disc 14, and upon movement of member 27 into notch 26, the blade 23 is tightly clamped in the notch of disc 14. Thus, through the turning of member 27 the blade 23 may be clamped and unclamped, and through the turning of member 25 the blade may be adjusted.

A scale 28 is provided on the front face of disc 14 extending from the blade 23, and the plate 21 is provided with an opening 29 through which the scale 28 is visible, plate 21 being provided with an index 30 cooperating with scale 28.

A pin 31 is fixed to the wall 32 of support means 10, which turnably supports the shaft 16 (Fig. 2), and this pin 31 is located beneath the disc 14. A roller 34 is turnably mounted on pin 31 for free rotation, this roller 34 being substantially tangent to part 35 of surface 12. A guide member 36 is fixed to the front wall 32 and has a substantially vertical face 37 located opposite roller 34. Also, a pawl member 38 is turnably mounted on wall 32 between roller 34 and member 36 and is urged toward the latter by the spring 39 fixed at one end to pawl 38 and at its opposite end to wall 32.

The above described apparatus operates as follows:

The strip 40 to be cut is guided between the vertical surface 37 and pawl 38 to the roller 34 and along the latter almost up to the part 35 of surface 12. The motor 17 is then turned on and turns the disc 14 in the direction of arrow 41 shown in Fig. 1. Thus, the moving member 22 and cutting blade 23 rotate together with disc 14 in the direction of arrow 41. The moving member 22 engages the strip 40 at the top of roller 34 and holds the same at point 35 of surface 12 against the latter so that the continuing rotation of disc 14 causes the member 22 to hold a part of strip 40 against surface 12 and thereby move the strip 40 along this surface. When the moving member or moving means 22 is located at a predetermined distance from part 35 of surface 12, the cutting means 23 will have arrived, as shown in Fig. 1, at roller 34 before part 35 of surface 12 and will cut the strip at this roller to provide a band or strip portion of a predetermined length corresponding to the peripheral distance between members 22 and 23. It is apparent that plate 21 may be adjusted by loosening and tightening of nut 20 to adjust this peripheral distance, and the scale 28 is designed to read directly in inches to indicate the length of the bands cut from the strip 40 which may be pulled from any supply roll along the roller 34 to point 35 and along the surface 12. Elements 11 and 34 form a substantially continuous surface along which the strip 40 is moved.

After a band is cut by blade 23, the member 22 moves the band around to the outlet end 42 of the arcuate member 11, and from this point the band falls onto surface 43 of member 36 to fall from this surface to any suitable location. It is apparent that the pawl 38 will prevent the strip 40 from moving back away from part 35 of surface 12 while freely permitting the band 40 to move toward this part 35, so that in this way successive free end portions of strip 40 always remain in position to be engaged by member 22 and moved thereby along the surface 12 to repeat the above-described operations.

Thus, the single motor 17 not only provides the force for feeding the strip to be cut but also provides the force for cutting the strip. It is believed to be apparent that the above-described apparatus may be easily adjusted to handle strips of many different sheet materials and to cut the same into portions of any desired length somewhat less than the circumference of disc 14. Furthermore, the above-described apparatus is extremely speedy in operation and produces several strip portions one right after the other in a rapid and efficient manner.

It will be understood that each of the elements described above, or two or more together, may also find a useful application in other types of apparatus for cutting strips into bands of predetermined length differing from the types described above.

While the invention has been illustrated and described as embodied in an apparatus for automatically cutting strips into bands of predetermined length, it is not intended to be limited to the details shown, since various modifications and structural changes may be made without departing in any way from the spirit of the present invention.

Without further analysis, the foregoing will so fully reveal the gist of the present invention that others can by applying current knowledge readily adapted for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Strip cutting apparatus comprising, in combination, support means having an arcuate substantially continuous surface located at a predetermined radial distance from a predetermined axis; a disc having a radius smaller than said radial distance and being turnably mounted at its center on said support means for rotation about said axis so as to provide an arcuate space between said disc and arcuate surface; turning means connected to said disc for rotating the same about said axis; a moving member fixed to said disc for turning movement therewith and extending from said disc into said arcuate space to engage a strip at a predetermined part of said arcuate surface and move the strip along said arcuate surface upon rotation of said disc; a cutting blade also fixed to said disc for rotation therewith and also extending into said arcuate space toward said arcuate surface, said cutting blade being located at a predetermined angular distance from said moving member so as to arrive and cut the strip at said part of said surface after said moving member has moved a predetermined distance beyond said part of said surface; and adjusting means connected to said moving member for adjusting the angular distance between the same and said cutting blade, said adjusting means being in the form of a plate carrying said moving member and being releasably connected to said disc for adjustable movement about said axis so as to adjust the position of said moving member with respect to said cutting blade.

2. Strip cutting apparatus comprising, in combination, support means having an arcuate substantially continuous surface located at a predetermined radial distance from a predetermined axis; a disc having a radius smaller than said radial distance and being turnably mounted at its center on said support means for rotation about said axis so as to provide an arcuate space between said disc and arcuate surface; turning means connected to said disc for rotating the same about said axis; a moving member fixed to said disc for turning movement therewith and extending from said disc into said arcuate space to engage a strip at a predetermined part of said arcuate surface and move the strip along said arcuate surface upon rotation of said disc; a cutting blade also fixed to said disc for rotation therewith and also extending into said arcuate space toward said arcuate surface, said cutting blade being located at a predetermined angular distance from said moving member so as to arrive and cut the strip at said part of said surface after said moving member has moved a predetermined distance beyond said part of said surface; and adjusting means connected to said moving member for adjusting the angular distance between the same and said cutting blade, said adjusting means being in the form of a plate carrying said moving member and being releasably connected to said disc for adjustable movement about said axis so as to adjust the position of said moving member with respect to said cutting blade, and a scale located on said disc between said blade and plate for indicating the distance between said blade and moving member.

3. Strip cutting apparatus comprising, in combination, support means having an arcuate substantially continuous surface located at a predetermined radial distance from a predetermined axis; a disc having a radius smaller than said radial distance and being turnably mounted at its center on said support means for rotation about said axis so as to provide an arcuate space between said disc and arcuate surface; turning means connected to said disc for rotating the same about said axis; a moving member fixed to said disc for turning movement therewith and extending from said disc into said arcuate space to engage a strip at a predetermined part of said arcuate surface and move the strip along said arcuate surface upon rotation of said disc; a cutting blade also fixed to said disc for rotation therewith and also extending into said arcuate space toward said arcuate surface, said cutting blade being located at a predetermined angular distance from said moving member so as to arrive and cut the strip at said part of said surface after said moving member has moved a predetermined distance beyond said part of said surface; and guide means forming part of said support means for guiding a strip to be cut to said predetermined part of said arcuate surface, and adjusting means connected to said moving member for adjusting the angular distance between the same and said cutting blade, said adjusting means being in the form of a plate carrying said moving member and being releasably connected to said disc for adjustable movement about said axis so as to adjust the position of said moving member with respect to said cutting blade.

References Cited in the file of this patent
UNITED STATES PATENTS

| | | |
|---|---|---|
| 280,178 | Hoyer | June 26, 1883 |
| 488,129 | Mendenhall | Dec. 13, 1892 |
| 765,316 | Keyes | July 19, 1904 |
| 893,582 | Hess | July 14, 1908 |
| 2,045,820 | Antone | June 30, 1936 |
| 2,204,369 | Leary | June 11, 1940 |
| 2,326,915 | Anderson | Aug. 17, 1943 |